United States Patent
Strasser

(10) Patent No.: US 7,030,368 B2
(45) Date of Patent: Apr. 18, 2006

(54) METHOD FOR OPERATING A POSITION MEASURING DEVICE AND POSITION MEASURING DEVICE SUITABLE THEREFOR

(75) Inventor: Erich Strasser, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 151 days.

(21) Appl. No.: 10/471,367

(22) PCT Filed: Feb. 21, 2002

(86) PCT No.: PCT/EP02/01821

§ 371 (c)(1),
(2), (4) Date: Feb. 13, 2004

(87) PCT Pub. No.: WO02/073135

PCT Pub. Date: Sep. 19, 2002

(65) Prior Publication Data

US 2004/0119000 A1  Jun. 24, 2004

(30) Foreign Application Priority Data

Mar. 9, 2001  (DE) ................ 101 11 630

(51) Int. Cl.
*G01D 5/34*  (2006.01)

(52) U.S. Cl. .............. 250/231.13; 250/231.18

(58) Field of Classification Search ............. None
See application file for complete search history.

(56) References Cited

U.S. PATENT DOCUMENTS

| 3,702,471 A * | 11/1972 | Kennedy et al. ............ 341/2 |
| 4,079,251 A | 3/1978 | Osann, Jr. |
| 5,406,077 A | 4/1995 | Aoki et al. |
| 6,091,219 A | 7/2000 | Maruo et al. |
| 2002/0015449 A1 | 2/2002 | Wastlhuber et al. |

FOREIGN PATENT DOCUMENTS

| DE | 43 41 787 A1 | 8/1995 |
| DE | 100 30 357 A1 | 1/2002 |

* cited by examiner

*Primary Examiner*—Que T. Le
(74) *Attorney, Agent, or Firm*—Brinks Hofer Gilson & Lione

(57) ABSTRACT

A position measuring operation system for determining positions of a first object and a second object, which can be moved in relation to the first object, including a position measuring system having a light source that is operated in a pulsed manner and an evaluation unit connected to the position measuring device and arranged downstream of the position measuring device. The evaluation unit requests transmission of data from the position measuring device by request pulses, which are separated by defined request cycle times and wherein a defined light source cycle time lies between the chronologically sequential light source exciter pulses and the light source cycle time is determined as a function of the request cycle time in such a way that a chronological synchronicity is assured between the light source pulses and the request pulses

15 Claims, 3 Drawing Sheets

METHOD FOR OPERATING A POSITION MEASURING DEVICE AND POSITION MEASURING DEVICE SUITABLE THEREFOR

Applicant claims, under 35 U.S.C. §§ 120 and 365, the benefit of priority of the filing date of Feb. 21, 2002 of a Patent Cooperation Treaty patent application, copy attached, Serial Number PCT/EP02/01821, filed on the aforementioned date, the entire contents of which are incorporated herein by reference, wherein Patent Cooperation Treaty patent application Serial Number PCT/EP02/01821 was not published under PCT Article 21(2) in English.

Applicant claims, under 35 U.S.C. § 119, the benefit of priority of the filing date of Mar. 9, 2001 of a German patent application, copy attached, Serial Number 101 11 630.6, filed on the aforementioned date, the entire contents of each of which are incorporated herein by reference.

BACKGROUND OF THE INVENTION

1. Field of the Invention

The present invention relates to a method for operating a position measuring system, as well as to a position measuring system suitable for this.

2. Description of the Related Art

Known position measuring systems are customarily supplied with a defined operating voltage by the downstream-connected evaluating unit, or control unit, via a connecting cable. The operating or supply voltage must be within predefined tolerance limits for maintaining the correct operation of the position measuring system. As a rule, a defined voltage drop occurs along the connecting cable. So that the voltage drop becomes as small as possible, it is necessary to keep the electrical current consumption, or the power loss, of the position measuring system low. For assuring this it is known to operate the light source of the position measuring system, one of the largest power consumers in the system, not continuously, but in a pulsed manner. In this connection, reference is made, for example, to U.S. Pat. No. 4,079,251, the entire contents of which is incorporated herein by reference; the pulsed light source operation in a battery-buffered incremental position measuring system is disclosed in it. The pulse frequency of the light source, or the clock rate, between the individual light pulses in the proposed system is selected on the basis of an estimate of the maximum output frequency of the generated incremental signals of the position measuring system.

SUMMARY AND OBJECTS OF THE INVENTION

It is an object of the present invention, a method for operating a position measuring system, which assures the least possible power current intake of the position measuring system during measuring operations.

It is furthermore an object of the present invention to disclose a suitable position measuring system, by which the least possible electrical current consumption of the position measuring system during measuring operations is assured.

The first object mentioned above is attained by a method for operating an optical position measuring system for determining the position of a first object which can which can be moved in relation to a second object. The method including transmitting data from a position measuring system to a downstream-arranged evaluation unit by having the evaluation unit request the transmitting by request pulses, which are separated from each other by defined request cycle times. Operating a light source of the position measuring system in a pulsed manner, wherein a defined light source cycle time lies between chronologically sequential light source exciter pulses and determining the light source cycle time as a function of the request cycle times between the request pulses in such a way that a chronological synchronicity is assured between the light source exciter pulses and the request pulses.

The second object listed above is attained by a position measuring operation system for determining a position of a first object which can be moved in relation to a second object, including a position measuring system having a light source that is operated in a pulsed manner and an evaluation unit connected to the position measuring device and arranged downstream of the position measuring device. The evaluation unit requests transmission of data from the position measuring device by request pulses, which are separated by defined request cycle times and wherein a defined light source cycle time lies between the chronologically sequential light source exciter pulses and the light source cycle time is determined as a function of the request cycle time in such a way that a chronological synchronicity is assured between the light source pulses and the request pulses.

In accordance with the present invention, the pulsed operation of the light source is matched specifically to the respective evaluation unit, or its interrogation pulse rates. As a rule, data, such as absolute position data, are requested in a chronologically fixed clock pattern from the position measuring system via the evaluation unit by request pulses. The synchronization of the light source cycle times with the respective request cycle times, or the matching of the light source cycle times to the request cycle times, preferably takes place during an initialization phase prior to the actual measuring operation.

It was shown to be particularly advantageous if furthermore a system-specific delay time is taken into consideration for the synchronization of the light source cycle times with the respective request cycle times. This delay time is the result of various system-specific influences between the emission of the light pulse by the light source and the actual determination of the respective data in the position measuring system. Based on the additional taking into consideration of such a delay time, a further increased precision of the absolute position determination results. In this case, the system-specific delay time can also be determined by measuring techniques in the mentioned initialization phase; however, alternatively it is also possible to preset a fixed value for the system-specific delay time.

Thus, an optimum adaptation of the pulsed light source operation to the respective evaluation unit, or to the respective configuration consisting of the position measuring system and the evaluation unit results; besides the current-saving operation of the light source, a precise determination of the absolute position is assured by this, if the transmitted data are absolute position data.

Alternatively to the transmission of absolute position data, the transmission of other data from the position measuring system to the evaluation unit can also be provided within the scope of the present invention. For example, these can be velocity and/or acceleration data, which are calculated in the position measuring system on the basis of the determined measured values and are processed for transmission.

Further advantages, as well as details of the present invention, ensue from the subsequent description of an exemplary embodiment by the attached drawings.

Shown are in:

DESCRIPTION OF THE PREFERRED EMBODIMENT(S) OF THE INVENTION

Figure 1:
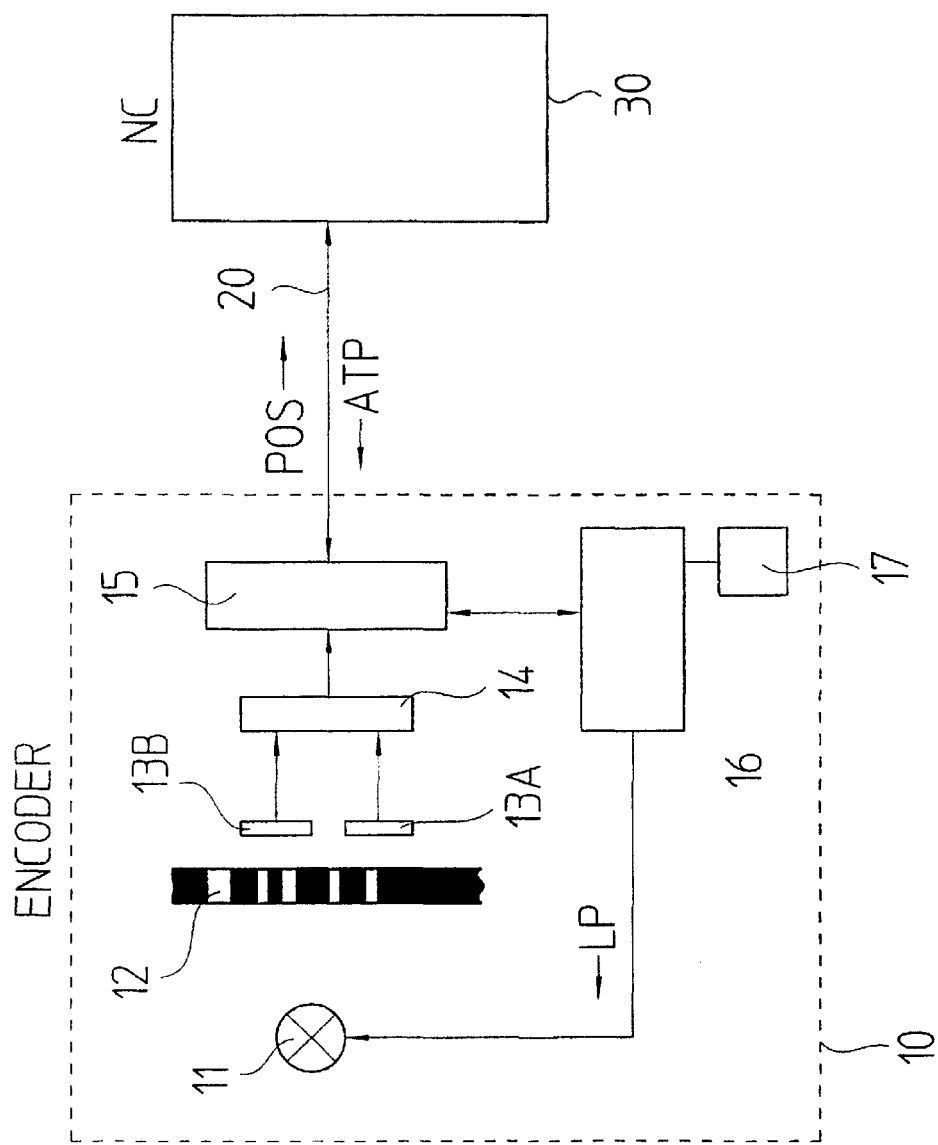
FIG. 1 shows a schematic block wiring diagram of an exemplary embodiment of a position measuring system in accordance with the present invention, including a downstream-arranged evaluation unit.

A block wiring diagram of an exemplary embodiment of a position measuring operation system that includes the position measuring system 10 in accordance with the present invention, together with a downstream-connected evaluation unit 30, is shown schematically in FIG. 1. A connecting line 20 between the position measuring system 10 and the evaluation unit 30 is also only schematically represented in this drawing figure. Communications between the position measuring system 10 and the evaluation unit 30, as well as the electrical current supply of the position measuring system 10, take place via the connecting line 20. A serial, bi-directional data transfer between the position measuring system 10 and the evaluation unit 30 is preferably provided. The connecting line 20 can of course also include a plurality of individual connecting lines. Basically a number of known variations can be considered for the concrete design of the communications and/or supply connection between the position measuring system 10 and the evaluation unit 30.

In this example, the position measuring system 10 is suitable for the absolute position determination of two objects which are movable with respect to each other, for example for detecting the tool position in a numerically-controlled machine tool; in this case a numerical machine tool control functions as the evaluation unit 30.

The position measuring system 10, embodied as an optical position measuring system 10 in this example, includes a scale 12, which is scanned by a scanning unit, which can be moved in relation to it. For this purpose, a light source 11, as well as one or several opto-electronic detector elements 13A, 13B are arranged on the side of the scanning unit. The scale 12 has a graduation structure which permits the determination of a defined absolute position on the basis of the resulting scanning signals. The scanned structure can perhaps be a suitable code structure in one or several tracks; however, other known graduation structures, which make possible an absolute position determination, can also alternatively be employed with the scale 12 within the scope of the present invention.

The position measuring system 10 can be laid out for detecting linear movements, as well as for detecting rotary movements.

The scanning signals registered by the detector elements 13A, 13B are fed to a signal processing unit 14 in the position measuring system 10, which determines the respective absolute position data POS from the scanning signals. The suitably processed position data POS are transmitted in the form of a serial data word for further processing to the evaluation unit 30 via a downstream-arranged interface unit 15 and the connecting line 20. In actual measuring operations, the transmission of the absolute position data POS takes place here in such a way that the evaluation unit 30 requests the transmission of absolute position data POS from the position measuring system 10 by interrogation pulses ATP; thus the actual absolute position is determined in the position measuring system 10 as the result of the interrogation pulse ATP, and the corresponding data word is transmitted to the evaluation unit 30.

Accordingly, in the present exemplary embodiment, absolute position data POS are transmitted by the position measuring system 10 to the downstream-arranged evaluation unit 30. As already indicated above, the transmitted data can also be other data, which are calculated in the position measuring system 10 on the basis of measured values, a possibility would be perhaps the transmission of calculated velocity and/or acceleration data, etc. However, in what follows, only absolute position data will be addressed in connection with the transmitted data in the course of the explanation of this exemplary embodiment.

Depending on the respective type of the evaluation unit 30, the request for the absolute position data POS takes place by means of interrogation pulses ATP, which are separated by defined request cycle times $\Delta t_{NC}$, i.e. in a customary fixed scanning pattern. The request cycle time $\Delta t_{NC}$ of an evaluation unit embodied as a machine tool control is approximately $\Delta t_{NC} \approx 125$ µsec.

In accordance with the present invention, the light source 11 is not operated continuously, but in a pulsed manner, for reducing the electrical current consumption of the position measuring system 10. The appropriate control of the light source 11 is performed via a schematically indicated light source control unit 16 in the position measuring system 10. For this purpose, the light source control unit 16 is connected with the light source 11, as well as with the interface unit 15, and therefore also with the evaluation unit 30. For the pulsed excitation of the light source 11, it is charged with light source exciter pulses LP in a suitable clock pattern by the light source control unit 16. The chronological spacing between chronologically sequential light source exciter pulses LP will be called the light source cycle time $\Delta t_{LQ}$ in what follows.

How the light source cycle time $\Delta t_{LQ}$ is determined in accordance with the present invention as a function of the request cycle time $\Delta t_{NC}$ of the evaluation unit 30 will now be explained by the subsequent FIGS. 2a to 2c. The goal of the matching of the light source cycle time $\Delta t_{LQ}$ with the request cycle time $\Delta t_{NC}$ is the production of a chronological synchronicity between the light source exciter pulses LP and the request pulses ATP. For a defined configuration of the position measuring system 10 and the evaluation unit 30, this matching preferably takes place during a synchronization phase prior to the actual measuring operation.

Figure 2:
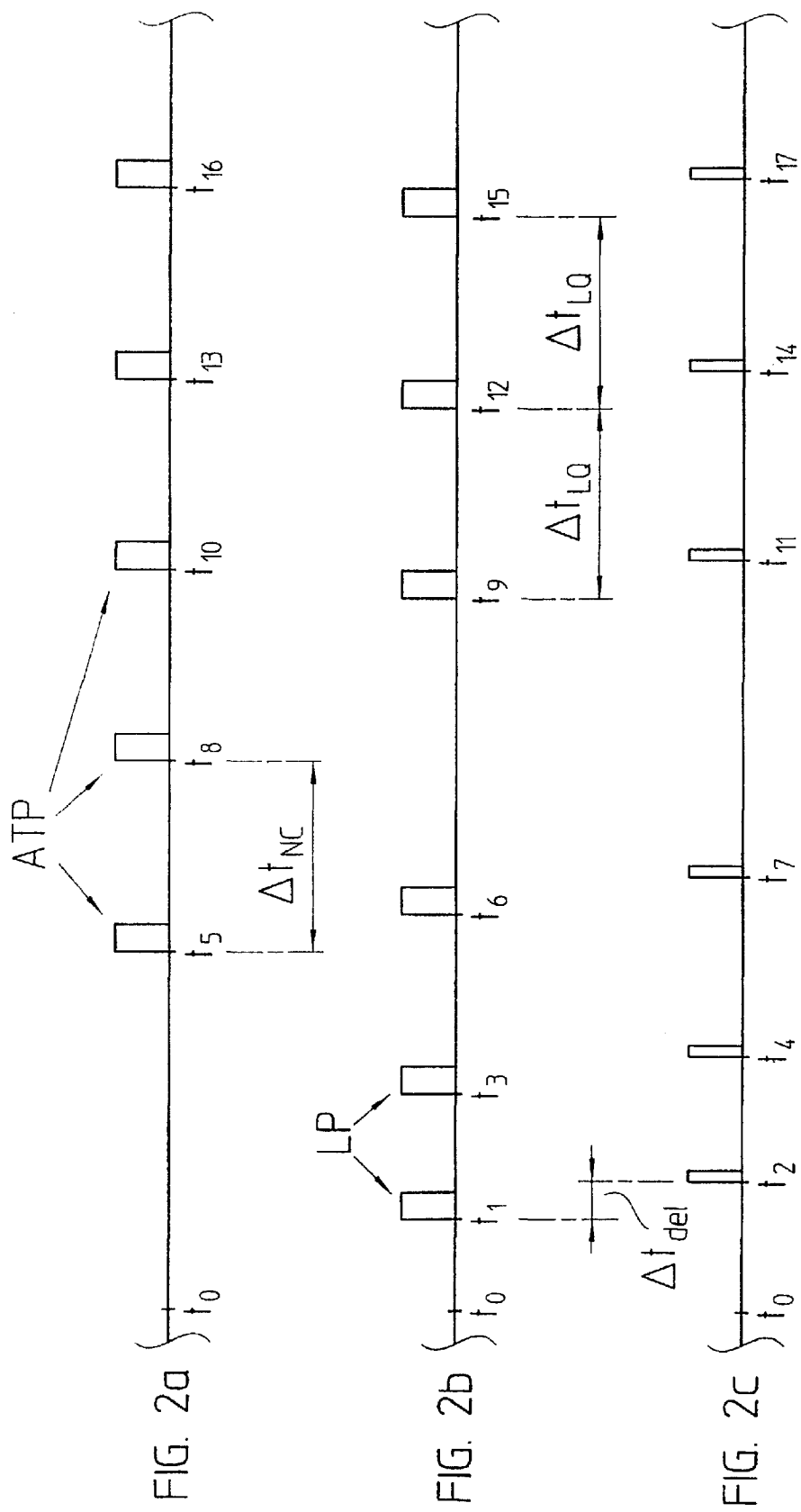
FIGS. 2a to 2c respectively show signal diagrams for explaining an embodiment of a method of the present invention.
Figure 3:
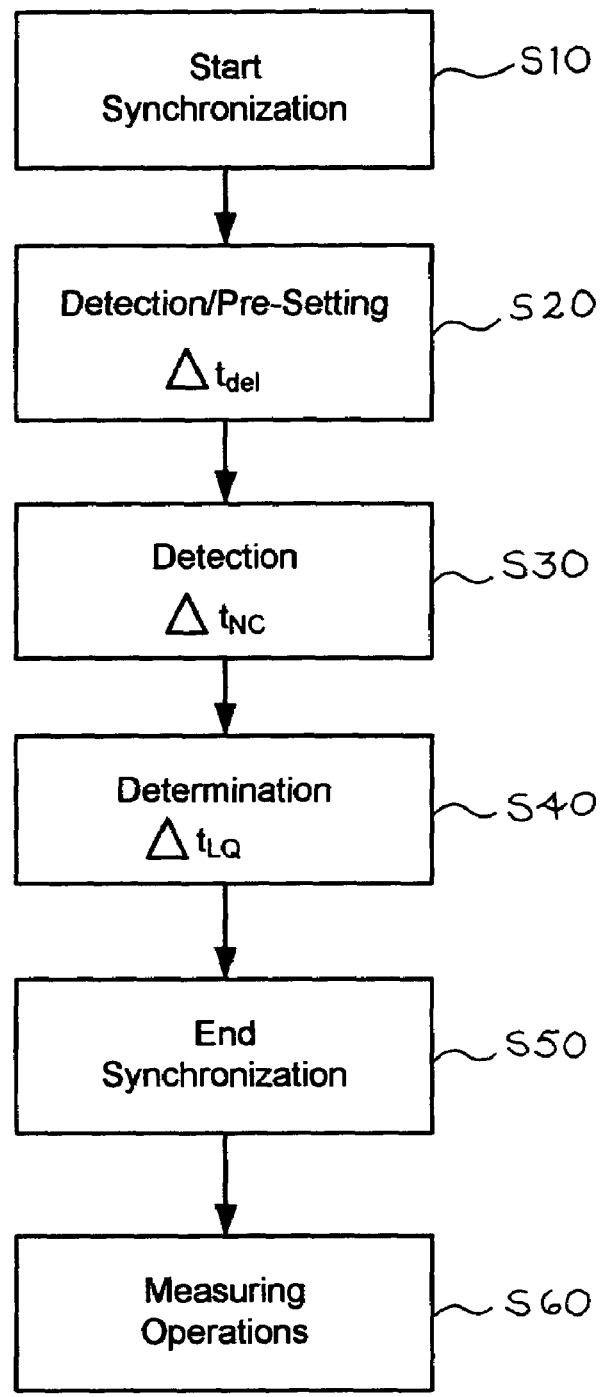
FIG. 3 shows a flow diagram for explaining an embodiment of a method of the present invention.

A flow diagram is represented in FIG. 3, by which the progress of various method steps will be explained in what follows by an example in connection with FIGS. 2a to 2c. FIG. 2a shows the chronological progress of the request pulses ATP, FIG. 2 provides the chronological progress of the light source exciter pulses LP, and FIG. 2c the chronological relative position of the position determination times with respect to the request pulses ATP and the light source exciter pulses LP in the synchronization phase and at the start of the subsequent measuring operations.

In the represented example, the synchronization phase (step S10), which precedes the actual measuring operations, starts at the time $t_0$. Within the first method step S20, at the time $t_1$ the light source is excited in a pulsed manner for a short time by a first light source exciter pulse LP. Because of various signal-delaying effects, the determination of the actual absolute position data does not take place in the position measuring system at the same time as $t_1$, but only at a later time $t_2$, as can be seen in FIG. 2c. Thus, a system-specific delay time $\Delta t_{del}$ lies between the times $t_1$ and $t_2$, which is first determined in the method step S20. The delay time $\Delta t_{del}$ typically lies in the order of magnitude of a few msec and is caused, inter alia, by signal running times and required build-up times of various electronic components.

In the course of the method step S20 in the represented example, the previously determined delay time $\Delta t_{del}$ is checked by another pulse-like excitation of the light source at the time $t_3$ and determination of the actual absolute position data at the time $t_4$; however, basically this is not absolutely required.

It should also be pointed out at this time that in step S20 of the method of the present invention it is not absolutely necessary to determine the delay time by measuring technology; instead it is possible on the basis of known system build-up times to fixedly predetermine a value for the delay time $\Delta t_{del}$ from the outside.

In the subsequent method step S30 the position measuring system receives a first request pulse ATP from the downstream-located evaluation unit at the time $t_5$. The second request pulse ATP follows at the chronological distance $\Delta t_{NC}$ at the time $t_8$. The chronological distance $\Delta t_{NC}$ between successive request pulses ATP, i.e. the clock pattern of the request pulses, is determined in method step S30. The respective evaluation units customarily operate at a chronological clock pattern during the measuring operation which does not change during the measuring operation.

The determination of the chronological distance $\Delta t_{NC}$ between successive request pulses ATP here is performed, for example, with the aid of a high-frequency oscillator module and a counter coupled with it.

In the case of an intended determination of the system-specific delay time $\Delta t_{del}$ by measuring technology, it is determined in the same way.

The values $\Delta t_{NC}$ and $\Delta t_{del}$ determined, or predetermined, in this way are thereafter stored in a memory of the position measuring system; an appropriate memory is identified with the reference numeral 17 in FIG. 1.

In the subsequent method step S40, the light source cycle time $\Delta t_{LQ}$ is selected, or determined, after the determination of the request cycle time $\Delta t_{NC}$ and the delay time $\Delta t_{del}$. This means that the light source cycle time is matched to the request pulses ATP, or their clock pattern. In the present example, the system-specific delay time $\Delta t_{del}$ is also taken into consideration in the course of this matching. This means that following the determination of the light source cycle time $\Delta t_{LQ}$, in the subsequent operations the light source exciter pulses LP are always generated at such a time that at the time of the request pulse expected thereafter, the determination of the actual absolute position data already takes place in the position measuring system.

The synchronization phase is terminated with step S50, and the actual measuring operation can follow in accordance with step S60.

Therefore, during measuring operations a light source exciter pulse LP is already generated in the represented example at the time $t_9$, i.e. shortly before the request pulse ATP expected at the time $t_{20}$. At the time $t_{10}$, at which the expected request pulse ATP then follows, the system has been sufficiently build-up, so that the absolute position determination can take place. The absolute position determination taking place at the time $t_{11}$ in the position measuring system then is chronologically synchronized with the request pulse ATP. Analogously therewith, in the subsequent measuring operation this takes place at each expected request pulse ATP, etc.

Various modifications are now also possible within the scope of the present invention.

It would also be possible in principle not to consider the system-specific delay time $\Delta T_{del}$ in the course of synchronizing the light source cycle time $\Delta t_{LQ}$ with the request cycle time $\Delta t_{NC}$, for example if this value is negligibly small in an appropriate configuration of a position measuring system.

The synchronization as described above is preferably performed prior to the actual measuring operations; the objects which can be moved in relation to each other should basically be at a stop. If, however, a relative movement inadvertently results during the synchronization phase, a warning signal is generated for indicating this to the respective user. It is possible, for example, to transmit an alarm bit from the position measuring system to the evaluation unit. But basically other types of warning signals are also conceivable, for example acoustic ones, visual ones, etc.

The above explained synchronization assumes that the chronological clock pattern of the request pulses ATP does not change during the actual measuring operations. It is therefore advantageous to continue to monitor the request cycle times also during the measuring operation and, in case of a possibly changed request cycle time $\Delta t_{NC}$, to also generate a warning signal to the user. This, too, can be done as an alarm bit transmitted to the evaluation unit; alternatively it is again possible to generate a visual or acoustic warning signal. In this case the measuring operation would have to be interrupted, and the above explained synchronization would have to be performed again.

Alternatively to the generation of a warning signal it is also possible to generate a light source excitation signal as soon as possible, or immediately, in the course of a stop, in order to generate absolute position data in the position measuring system and to start the synchronization phase again.

Finally, in conclusion, the possibility should be pointed out for also transmitting other data than the mentioned absolute position data in the described way.

The present invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A method for operating an optical position measuring system for determining positions of a first object and a second object, which can which can be moved in relation to said first object; the method comprising:

transmitting data from a position measuring system to a downstream-arranged evaluation unit by having said evaluation unit request said transmitting by request pulses, which are separated from each other by defined request cycle times;

operating a light source of said position measuring system in a pulsed manner, wherein a defined light source cycle time lies between chronologically sequential light source exciter pulses; and determining said light source cycle time as a function of said request cycle times between said request pulses in such a way that a chronological synchronicity is assured between said light source exciter pulses and said request pulses.

2. The method in accordance with claim 1, further comprising transmitting absolute position data by said position measuring system to said evaluation unit in the form of data.

3. The method in accordance with claim 2, further comprising synchronizing said light source cycle time with said request cycle times.

4. The method in accordance with claim 3, wherein said synchronizing comprises taking into consideration a system-specific delay time, which results between one of said light source exciter pulses and an actual determination of said data from said position measuring system.

5. The method in accordance with claim 3, wherein said synchronizing takes place during a synchronization phase prior to an actual measuring operation performed by said position measuring system so as to determine said position of said first and second objects wherein said first and second objects are at a stop.

6. The method in accordance with claim 5, further comprising generating a warning signal in case of a relative movement between said first object and said second object during said synchronization phase.

7. The method in accordance with claim 1, further comprising:
monitoring said request cycle time; and
generating a warning signal in case of a changing request cycle time.

8. The method in accordance with claim 7, wherein further synchronizing is performed after said generating said warning signal.

9. The method in accordance with claim 7, further comprising transmitting an alarm bit from said position measuring system to said evaluation unit as said warning signal.

10. The method in accordance with claim 5, wherein request cycle times are determined in said synchronization phase.

11. The method in accordance with claim 5, wherein said system-specific delay time is determined in said synchronization phase.

12. A position measuring operation system for determining positions of a first object and a second object, which can be moved in relation to said first object, comprising:
a position measuring system comprising a light source that is operated in a pulsed manner;
an evaluation unit connected to said position measuring device and arranged downstream of said position measuring device, wherein said evaluation unit requests transmission of data from said position measuring device by request pulses, which are separated by defined request cycle times; and
wherein a defined light source cycle time lies between the chronologically sequential light source exciter pulses, and
said light source cycle time is determined as a function of the request cycle time in such a way that a chronological synchronicity is assured between said light source pulses and said request pulses.

13. The system in accordance with claim 12, wherein said position measuring system transmits absolute position data as data to said evaluation unit.

14. The system in accordance with claim 13, wherein a system-specific delay time is taken into consideration for synchronization of said light source cycle time with said request cycle time which results between a light source exciter pulse and actual determination of said data.

15. The system in accordance with claim 14, wherein said request cycle times and said system-specific delay time are stored in a memory of said position measuring system.

* * * * *